United States Patent [19]

Seltzer

[11] Patent Number: 4,866,854
[45] Date of Patent: Sep. 19, 1989

[54] MULTIPLE AXIS DISPLACEMENT SENSOR

[75] Inventor: Donald S. Seltzer, Arlington, Mass.

[73] Assignee: The Charles Stark Draper Laboratory, Inc., Cambridge, Mass.

[21] Appl. No.: 938,272

[22] Filed: Dec. 5, 1986

[51] Int. Cl.⁴ .............................................. G01B 7/02
[52] U.S. Cl. ....................................... 33/558; 33/561
[58] Field of Search .................... 33/169 R, 556, 557, 33/558, 559, 560, 561, 503, 504, 505, 172 E; 324/207, 208, 251, 832

[56] References Cited

U.S. PATENT DOCUMENTS

| | | | |
|---|---|---|---|
| 4,078,314 | 3/1978 | McMurtry | 33/172 E X |
| 4,563,823 | 1/1986 | Klinger | 33/558 |
| 4,701,704 | 10/1987 | Fukuyoshi | 33/558 X |
| 4,703,261 | 10/1987 | Berchtold | 33/558 X |

Primary Examiner—Harry N. Haroian

Attorney, Agent, or Firm—Joseph S. Iandiorio; Brian M. Dingman

[57] ABSTRACT

A multiple axis displacement sensor is provided for sensing displacement of two relatively movable parts in a plurality of degrees of freedom. There are a plurality of displacement sensing units, each unit including at least two magnetic poles mounted on one of the parts, and at least two Hall Effect devices mounted on the other of the parts, and disposed relative to the poles so that relative displacement of parts in at least one degree of freedom causes at least one of the poles to move toward a respective said Hall Effect device and at least one other of the poles to move away from another respective Hall Effect device. The outputs of the Hall Effect device are differentially combined to produce a signal linearly representative of displacement of the poles relative to the Hall Effect devices.

25 Claims, 9 Drawing Sheets

MULTIPLE AXIS DISPLACEMENT SENSOR

FIELD OF INVENTION

This invention relates to a multiple axis displacement sensor and more particularly to sensor for measuring the displacement between two relatively movable parts, such as the fixed and movable parts of a compliant device, in a plurality of degrees of freedom.

BACKGROUND OF INVENTION

It is often desirable or necessary to measure the displacement of the movable part of a compliance device relative to the fixed portion of the device. This is particularly so for remote center compliance (RCC) devices which are passively compliant mechanisms that perform assembly, mating and insertion tasks. Various types of RCC devices are disclosed in U.S. Patent Nos. 4,098,001, 4,155,169, 4,337,579, 4,414,750, all incorporated herein by reference.

RCC devices are passively adjustable so that they quickly and easily accommodate for relatively small misalignments. These devices have now been instrumented so that, in addition to being passively adjustable for assembling misaligned parts, they are now also able to indicate a measure of the misalignment.

Presently RCC devices are instrumented by one of a number of displacement sensing systems, including inductive proximity sensors, linear photodiode arrays, differential photodiode pairs and dual axis lateral effect photoposition sensors. Often, these sensing systems employ instrumenting electronics on the movable part of the compliance device. Such electronics require signal and power wires which tend to interfere with the movable part and may adversely affect deflection characteristics of the RCC device. Assembling and disassembling may also be difficult. And a number of the displacement sensing techniques are not able to provide measurements in all six degrees of freedom in which the RCC device moves.

Various position sensing instruments have employed a magnetic pole in conjunction with a Hall Effect device to measure displacement. However, these devices have not provided satisfactory results in multiple degrees of freedom. They tend to experience considerable cross axis coupling wherein the measurement of the displacement in a particular degree of freedom is affected by movement in one or more other degrees of freedom. And because the magnetic field varies exponentially with distance, the sensed output also varies exponentially. As a result, the sensed displacement along or about one axis of interest is dependent upon the degree of displacement along or about an entirely different axis.

SUMMARY OF INVENTION

It is therefore an object of this invention to provide a multiple axis displacement sensor which achieves for improved sensitivity, selectivity and resolution in measuring movement in one or more degrees of freedom.

It is a further object of this invention to provide a multiple axis displacement sensor which provides a linear output signal and greatly reduces cross axis coupling.

It is a further object of this invention to provide a multiple axis displacement sensor which is rugged, compact, relatively inexpensive and relatively simple to assemble, disassemble and adjust.

It is a further object of this invention to provide a multiple axis displacement sensor which may be effectively utilized on a compliance device without interfering with the operation of the compliance device or its parts.

It is a further object of this invention to provide a multiple axis displacement sensor which effectively measures movement of a compliance device in up to six degrees of freedom.

This invention results from a realization that in a multiple axis displacement sensor, a linear output signal which provides improved sensitivity and resolution and reduced cross axis coupling may be achieved by mounting a pair of magnetic poles on one of two relatively movable parts and mounting a pair of Hall Effect devices on the other of the parts, such that relative displacement of the parts in a particular degree of freedom causes one of the poles to move toward one of the Hall Effect devices and the other of the poles to move away from the other Hall Effect device and then differentially combining the outputs of the Hall Effect devices.

This invention features a multiple axis displacement sensor for sensing displacement, in a plurality of degrees of freedom, of two relatively movable parts. The sensor includes a plurality of displacement sensing units. Each unit includes at least two magnetic poles mounted on one of the parts, and at least two Hall Effect devices mounted on the other of the parts, and disposed relative to the pole so that relative displacement of the parts in at least one degree of freedom causes at least one of the poles to move toward a respective Hall Effect device and at least one other of the poles to move away from another respective Hall Effect device. There are means for differentially combining the outputs of the Hall Effect devices to produce a signal linearly representative of the displacement of the poles relative to the Hall Effect devices.

In a preferred embodiment the sensor is used for detecting displacement of a movable part of a compliance device relative to the fixed part of the device. The Hall Effect devices may be mounted on the fixed part of the compliance device and the magnetic poles mounted on the movable part. The poles may be formed by permanent magnet means. Those poles may also be formed by an annular magnet attached to the movable part of the compliance device.

Preferably, a first pair of sensing units are disposed in a first plane which is perpendicular to the axis of symmetry of the compliance device. A second pair of sensing units may also be disposed in a second plane which is perpendicular to the axis of symmetry and spaced from the first plane. The first pair of sensing units may be arranged perpendicularly to each other about the axis of symmetry and the second pair of sensing units may also be arranged perpendicularly to each other about the axis of symmetry. At least one of the sensing units may include an axis which extends in a plane which is perpendicular to the axis of symmetry. Alternatively, at least one of the sensor units may include an axis which is parallel to the axis of symmetry of the compliance device. A third sensing unit may disposed in the first plane at an angle from the first pair of units, and likewise a third sensing unit may be disposed in the second plane at an angle from the second pair of units.

Preferably, the means for differentially combining includes an amplifier circuit.

Means may be provided for transforming the representative signal from at least two of the displacement sensing units into output signals representative of one or more rotational and translational displacements of the movable part relative to the fixed part. For example, means may be provided for transforming the representative signals from the first pair of sensing units directly into output signals representative of translational displacement of the movable part relative to the fixed part along two mutually perpendicular axes perpendicular to the axis of symmetry of the compliance device. The means for transforming may transform representative signals from the first and second pairs of sensing units directly into output signals representative of rotational displacement of the movable part relative to the fixed part about two mutually perpendicular axes perpendicular to the axes of symmetry and translational displacement of the movable part relative to the fixed part along the mutually perpendicular axes. The representative signals from three sensing units in one plane may be transformed directly into output signals representative of rotational displacement of the movable part relative to the fixed part about two mutually perpendicular axes perpendicular to the axis of symmetry and translational displacement of the movable part relative to the fixed part along the axis of symmetry. Alternatively, the representative signals from the three sensing units in one plane may be transformed directly into output signals representative of translational displacement along two mutually perpendicular axes perpendicular to the axis of symmetry and rotational displacement about the axis of symmetry. With six sensing units, means may be provided for transforming six representative signals into translational and rotational displacement measurements in six degrees of freedom.

One sensing unit may include three magnetic poles and three associated Hall Effect devices. The poles and Hall Effect devices may be disposed in a plane which is perpendicular to the axis of symmetry of the compliance device. In such a case the means for combining may include means for transforming the output signals from the three Hall Effect devices directly into one or more rotational and translational displacements of the movable part relative to the fixed part.

DISCLOSURE OF PREFERRED EMBODIMENTS

Other objects, features and advantages will occur from the following description of preferred embodiments and the accompanying drawing, in which.

A multiple axis displacement sensor according to this invention is provided for sensing displacement of two relatively movable parts in a plurality of degrees of freedom. For example, the sensor may be advantageously employed in a compliance device for measuring the relative displacement between the fixed part and movable part of the device. The displacement sensor may be employed in various types of compliance devices such as those devices disclosed in U.S. Pat. Nos. 4,098,001; 4,155,169; 4,337,579; and 4,414,750, all of which are incorporated herein by reference.

The sensor includes a plurality of displacement sensing units. Each unit includes at least two magnetic poles mounted on one of the parts and at least two Hall Effect devices mounted on the other of the parts. The Hall Effect devices are movable part relative to the fixed part in at least one of the degrees of freedom causes at least one of the poles to move toward a respective Hall Effect device and at least one of the other poles to move away from another respective Hall Effect device. The outputs of the Hall Effect devices are differentially combined, for example, by an amplifier circuit to produce a signal which is linearly representative of the displacement of the poles relative to the Hall Effect devices. This linearly representative signal may provide a direct indication of displacement in a degree of freedom or alternatively, may be combined with the signals from other sensors in a geometric transformation circuit to produce an indication of translational or rotational movement in any convenient cartesian reference frame. This geometric transformation may be performed by an analog summing and multiplying circuit, or may be performed by a digital computer equipped with an analog to digital interface.

Typically, the Hall Effect devices are mounted on the fixed part of the compliance device and the magnetic poles are mounted on the movable part, e.g., the operator member. As a result, wiring does not interfere with the movement of the movable part or operator member. Alternatively, however, the Hall Effect devices may be mounted on the operator member and the magnetic poles may be disposed on the fixed portion of the compliance device. One preferred sensing unit includes a pair of magnetic poles formed by a single permanent magnet and a pair of Hall Effect devices, all arranged substantially linearly. An alternative sensing unit includes three magnetic poles and three Hall Effect devices. The former sensing unit may be utilized to measure displacement in only a single associated degree of freedom. The latter sensing unit, on the freedom. The magnetic poles may be formed by, for example, cylindrical magnets which are bonded or otherwise attached to the operator member of the compliance device. Alternatively, poles may be formed by a single annular magnet which has multiple pole pairs spaced along its circumference. In still another embodiment, a permanent magnet may be mounted at the end of arms which extend radially from the operator member. Each such permanent magnet extends between a pair of Hall Effect devices, with each of the poles facing a respective Hall Effect device. Various electromagnets may also be employed to provide the poles. In all of these embodiments a preferred Hall Effect device includes the 9SS Lohet, manufactured by Micro Switch.

Preferably, a first pair of sensing units are disposed in a first plane which is perpendicular to the axis of symmetry of the compliance device and the first pair of sensing units may be arranged perpendicularly to each other about the axis of symmetry. A second pair of sensing units may be disposed in a second plane which is perpendicular to the axis of symmetry and spaced from the first plane. The second pair of sensing units are typically arranged perpendicularly to each other about the axis of symmetry of the RCC device. Third sensing units may be disposed in either or both of the first and second planes at an angle from the first and/or second pairs of sensing units. One or more of the sensing units may include an axis which is disposed in a plane that is perpendicular to the axis of symmetry of the compliance device. Indeed, the axis of the sensing unit may intersect the axis of symmetry where the magnets are mounted on the movable part of the compliance device. Alternatively, one or more of the sensing units may include an axis which is parallel to the axis of symmetry of as described above by permanent magnets mounted at the end of an arm extending from the movable part and disposed between a pair of Hall Effect devices.

The representative linear signals are typically transformed into output signals representative of one or more rotational and translational displacements of the movable part relative to the fixed part. Such transformations are performed, for example, in a microprocessor circuit such as an IBM PC/XT and an analog to digital convertor such as is provided by Data Translation.

By employing the construction of this invention the effects of cross-axis coupling are greatly diminished. Movement in each degree of freedom can be independently monitored. As a result, enhanced sensitivity and improved resolution are achieved.

Figure 1:
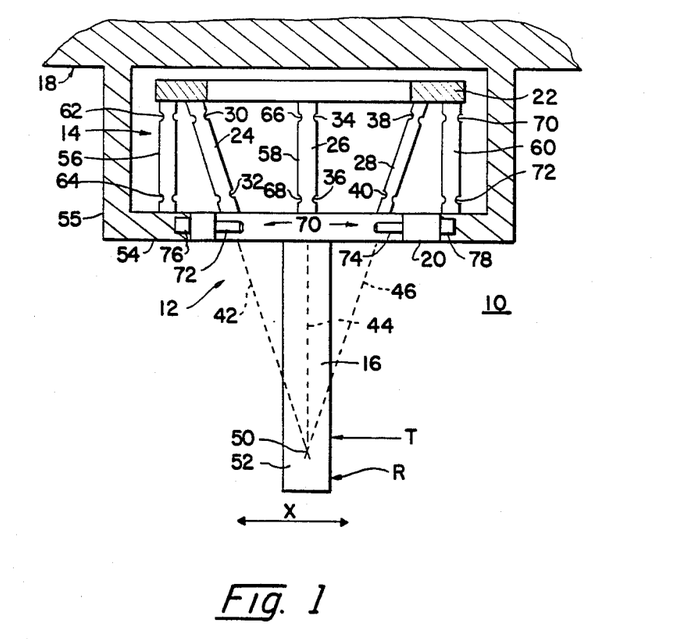
FIG. 1 is a schematic cross-sectional view of a remote center compliance center employing the multiple axis displacement sensor of this invention.

There is shown in FIG. 1 remote center compliance device 10 including means for establishing rotational motion 12 and means for establishing translational motion 14. An operator member, rod 16, is extended outwardly from the means for establishing rotational motion 12, and the means for establishing rotational motion 12 and translational motion 14 are concatenated and extended from the fixed part 18 of the machine or device in which they are applied. Rod 16 is typically replaced by or carries a robot hand, mechanical grip, claws, clamps or the like which manipulate the part to be inserted or directed by the mechanism. The means for establishing a rotational motion includes a member, plate 20, and another member, ring 22, which are relatively, rotatably interconnected by means such as flexures 24, 26 and 28. These flexures have major motion portions, pairs of reduced portions 30, 32; 34, 36; and 38, 40, respectively, conveniently located proximate associated plates 20, 22 in order to concentrate the motion of those reduced portions. Flexures 24, 26 and 28 lie along portions or radii 42, 44 and 46 which emanate from center 50 which is remote from the system: it exists at, near or beyond the free end 52 of rod 16.

The means for establishing translational motion 14 includes a member such as lip 54 integral with cylindrical wall 55 of machine 18, and another member, constituted by plate 22, which thus forms a part of both the translational and rotational mechanisms. The means for establishing translational motion 14 also includes between plate 22 and lip 54 flexures 56 and 60 and an additional flexure 58 which is largely blocked from view by flexure 26. Each of the flexures has reduced portions 62, 64; 66, 68; and 70, 72, respectively, similar to those associated with flexures 24, 26 and 28. A translational force T on the end 52 of rod 16 causes relative translational motion between plates 20 and 22 by means of flexures 56, 58 and 60, while a rotational force R about the end 52 causes relative rotational motion between plates 20 and 22 about remote center 50 by means of flexures 24, 26 and 28.

Displacements between operating member 16 and fixed member 18 are measured by a sensor which includes multiple sensing units 70. Each sensing unit includes a pair of permanent magnets 72, 74, which are bonded or otherwise attached to member 20 attached to movable member 16. A pair of Hall Effect devices 76, 78 are similarly attached to lip 54 of fixed part 18 and are arranged generally axially linearly with magnets 72 and 74. Each magnet includes a north pole "N" which faces a respective Hall Effect device 76 and 78.

A typical remote center compliance device exhibits six degrees of freedom, e.g. it may be displaced translationally along X, Y and Z axes and rotationally about the X, Y and Z axes. Each sensing unit 70 contributes to displacement measurements in a single respective degree of freedom. For example, sensing unit 70, FIG. 1, detects movement of member 16 along the X axis. A similar sensing unit, not shown, may be arranged perpendicularly to sensing unit 70 for measuring displacement along the Y axis.

Figure 2:
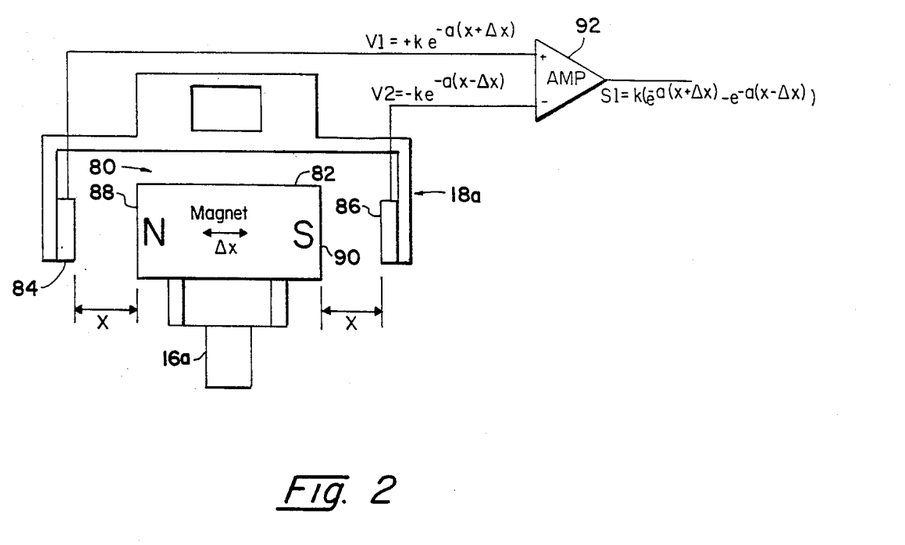
FIG. 2 is a schematic elevational view of a displacement sensing unit utilizing a single magnet with north and south poles.

Operation of a single sensing unit 80 is shown in FIG. 2. Therein a single permanent magnet 82 (or alternatively an electromagnet) is mounted to movable part 16a and Hall Effect devices 84 and 86 are attached to fixed part 18a. The north pole of magnet 88 of magnet 82 faces Hall Effect device 84, and the south pole 90 faces Hall Effect device 86. Each Hall Effect device senses the strength of the magnetic field created by the respective facing pole and produces a signal indicative of that field strength. With movable part 16a at rest, there is an equal distance X between each of the poles and their respective Hall Effect sensors. Hence, the field strengths measured by devices 84 and 86 are equal. However, when part 16a is moved translationally by an amount Δx, the strength of the magnetic field sensed by one of the Hall Effect devices increases, whereas the strength of the field from the opposite pole sensed by the other of the devices decreases. The difference of the resultant output signals is then determined to provide a measurement of the degree of deflection. For example, as shown in FIG. 2, Hall Effect device 84 provides a non-linear output signal $$V1 = +ke^{-a(x+\Delta x)}$$

On the other hand, Hall device 86 provides a non-linear output signal $$V2 = -ke^{-a(x-\Delta x)}$$

To determine the difference, signals V1 and V2 are differentially combined in an amplifier 92. Because devices 84 and 86 are confronting north and south poles respectively, their output signals are positive and negative, respectively. Therefore, to differentially combine the signals both of the inputs of amplifier 92 are made positive. As a result, the output signal S1 provided by amplifier 92 is as follows:

$$S1 = k(e^{-a(x+\Delta x)} - e^{-a(x-\Delta x)})$$

The signal S1 is both highly linear and representative of displacement of poles 88 and 90 relative to Hall Effect devices 84, 86 and, hence, displacement of movable part 16a relative to fixed part 18a along the X axis is achieved by resolving this linear equation. Of course, if there has been no translation along the X axis, i.e. Δx=0, S1 is resolved as follows:

$$S1 = k(e^{-ax} - e^{-ax})$$

$$S1 = 0$$

Figure 3:
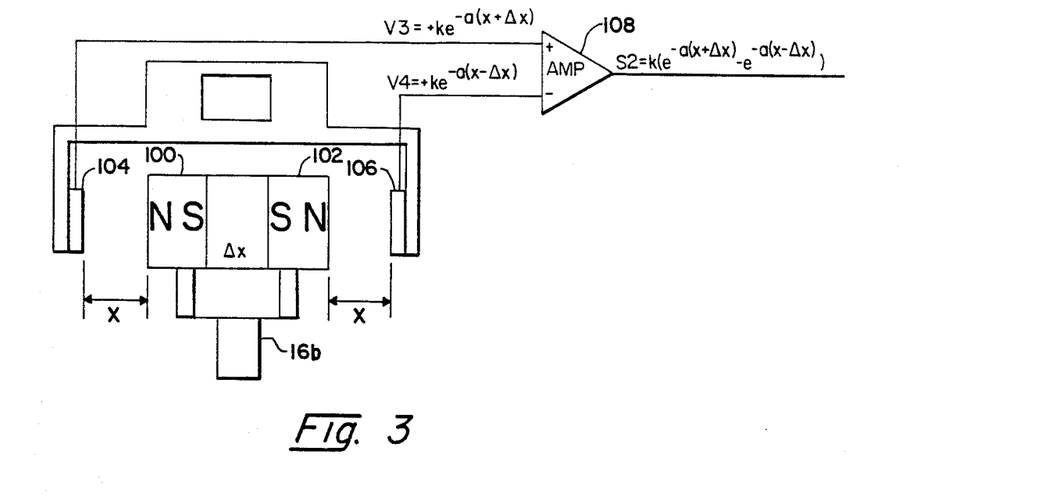
FIG. 3 is a schematic view of an alternative displacement sensing unit employing a pair of magnets.

As shown in FIG. 3, a pair of permanent magnets 100, 102 may be mounted on movable part 16b. In this case the north pole of each magnet confronts a respective Hall device 104 and 106 respectively. As a result, the output signals V3 and V4 from devices 104 and 106 are both positive. In particular, $$V3 = +ke^{-a(x+\Delta x)}$$

$$V4 = +ke^{-a(x-\Delta x)}$$

These output voltages are differentially combined in amplifier 108. Because both of the voltages are positive, amplifier 108 is provided with one positive and one negative input. This allows V3 and V4 to be differentially combined to provide an output signal S2 according to the expression:

$$S2 = k(e^{-a(x+\Delta x)} - e^{-a(x-\Delta x)})$$

Again, this linear expression is solved to provide a measurement of translational displacement.

Figure 4:
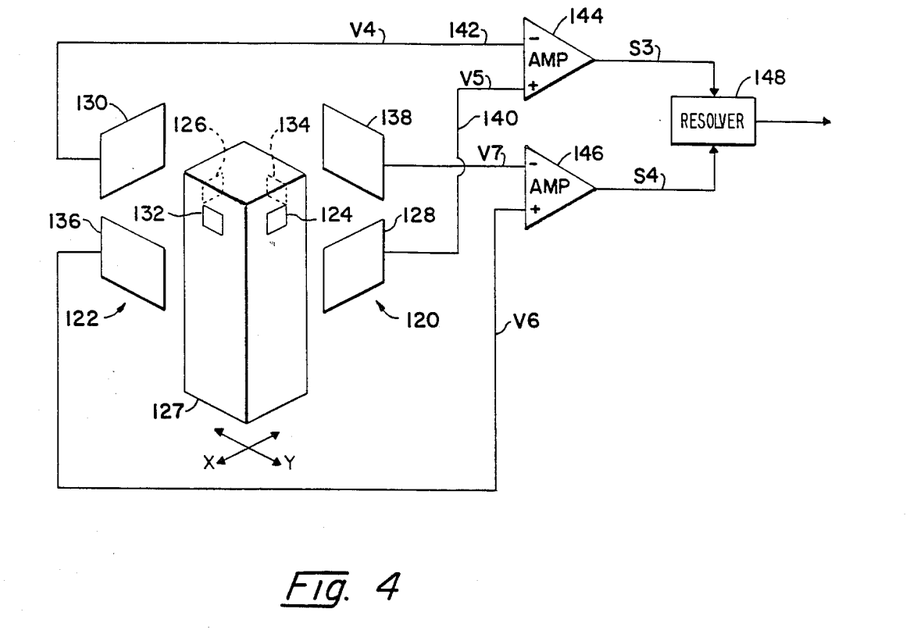
FIG. 4 is a schematic view of a displacement sensor which includes a pair of displacement sensing units for measuring displacement in two degrees of freedom.

Translational displacement along perpendicular X and Y axes is measured as shown in FIG. 4. Therein, a pair of sensing units 120, 122 are arranged perpendicular to one another in a plane which perpendicularly intersects the axis of symmetry of the compliance device. In particular, sensing unit 120 includes north magnetic poles 124 and 126 mounted on opposite faces of the movable part 127 of a compliance device. Pole 124 confronts a Hall Effect device 128 and pole 126 similarly confronts a Hall Effect device 130. Similarly, sensing unit 122 includes north poles 132 and 134 mounted to opposite faces of movable part 127. Pole 132 faces a Hall Effect device 136 and pole 134 similarly faces a Hall Effect device 138.

Each of sensing units 120 and 122 operate as described in FIGS. 2 and 3. Hall Effect devices 128 and 130 measure the magnetic field strengths of poles 124 and 126, respectively, and provide output signals which are indicative of those strengths over lines 140 and 142 to an amplifier 144. Signals V4 and V5 are differentially combined in amplifier 144 to provide an output signal S3 which is linearly representative of the displacement of poles 124 and 126 between devices 128 and 130. Hall Effect devices 136 and 138 provide similar signals V6 and V7 to a second amplifier 146, where those signals are differentially combined to provide a signal S4 which is linearly representative of the displacement of poles 132 and 134 between Hall Effect devices 136 and 138.

Signals S3 and S4 are provided to a resolver 148 where they are transformed according to the matrix equation:

$$\begin{bmatrix} X \\ Y \end{bmatrix} = \begin{bmatrix} 1 & 0 \\ 0 & 1 \end{bmatrix} \begin{bmatrix} S4 \\ S3 \end{bmatrix}$$

This equation is solved for X and Y to provide a direct indication of the translational displacement along the respective X and Y axes as follows:

$$X = S4$$

$$Y = S3$$

Figure 5:
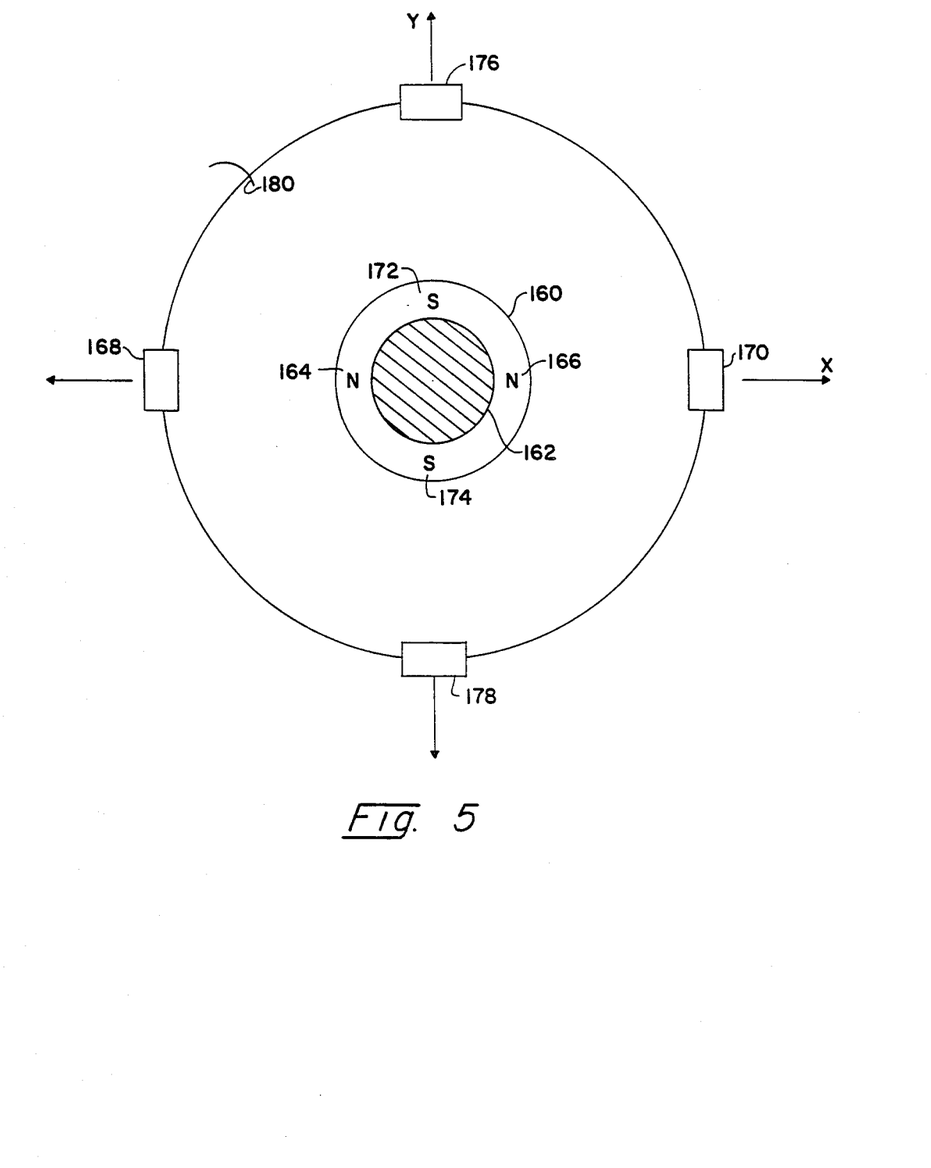
FIG. 5 is a top cross-sectional view of a compliance device utilizing an annular magnet to implement the displacement sensor of FIG. 4.

An alternative manner of mounting the magnetic poles on the movable part of the compliance device is shown in FIG. 5. Therein an annular magnetic ring 160 is attached to a movable part 162. Magnet 160 includes, for example, north poles 164 and 166 facing Hall Effect devices 168 and 170 disposed along the X axis. Likewise, magnet 160 includes south poles 172 and 174 confronting Hall Effect devices 176 and 178 along the Y axis. Each of the Hall Effect devices is mounted on a fixed part 180 of the compliance device.

Figure 6:
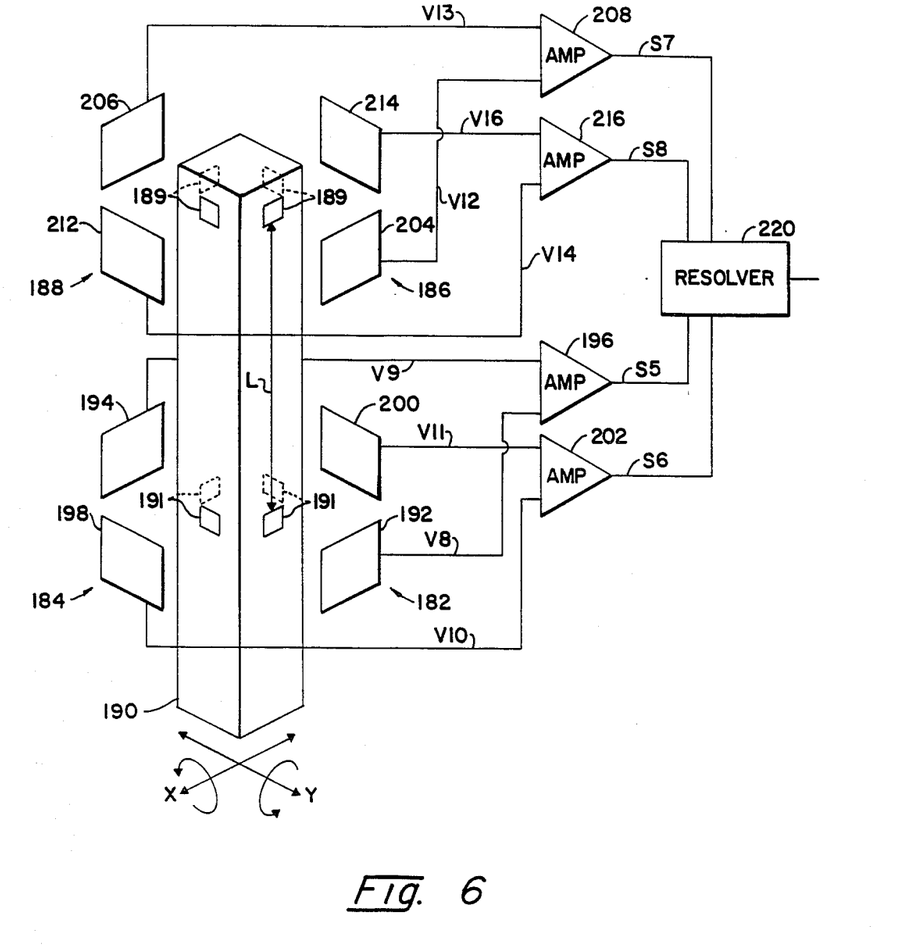
FIG. 6 is a schematic view of a displacement sensor which includes four displacement sensing units for measuring displacement in four degrees of freedom.

Displacement in four degrees of freedom is measured as shown in FIG. 6. Therein, first and second sensing units 182 and 184 are disposed, similar to the sensing units described in FIG. 4, in a first plane which is perpendicular to the axis of symmetry of the compliance device. Likewise, a second pair of sensing units 186 and 188 are disposed in a second plane which is perpendicular to the axis of symmetry and is spaced a distance L from the first plane. Each sensing unit is disposed along a respective X or Y axis. In each case the poles 190, 191 of the sensing unit are mounted in movable part 190 and the confronting Hall Effect devices are mounted to the fixed part, not shown, of the compliance device. Hall Effect devices 192 and 194 of sensing unit 182 provide signals V8 and V9 respectively to amplifier 196 where they are differentially combined to provide a signal S5 which is linearly representative of the displacement of one of poles 191 toward one of devices 192 and 194 and another of poles away from the other of those devices. Hall Effect devices 198 and 200 of sensing unit 184 similarly provide respective signals V10 and V11 to an amplifier 202 which differentially combines those signals to provide a signal S6 which is linearly representative of the movement of poles 191 between Hall Effect devices 198 and 200.

In the same manner, Hall Effect devices 204 and 206 of sensing unit 186 provide signals V12 and V13 which are differentially combined in amplifier 208 to yield a linear signal S7; and devices 212 and 214 of unit 188 provide signals V14 and V16 which are differentially combined by amplifier 216 to provide linear signal S8.

Linearly representative signals S5, S6, S7 and S8 are provided to a resolver 220 which transforms those signals into X and Y translational and X and Y rotational displacements according to the following matrix relationship:

$$\begin{bmatrix} X \\ Y \\ \theta_x \\ \theta_y \end{bmatrix} = \begin{bmatrix} .5 & 0 & .5 & 0 \\ 0 & .5 & 0 & .5 \\ 0 & -1/L & 0 & +1/L \\ +1/L & 0 & -1/L & 0 \end{bmatrix} \begin{bmatrix} S8 \\ S7 \\ S6 \\ S5 \end{bmatrix}$$

Figure 7:
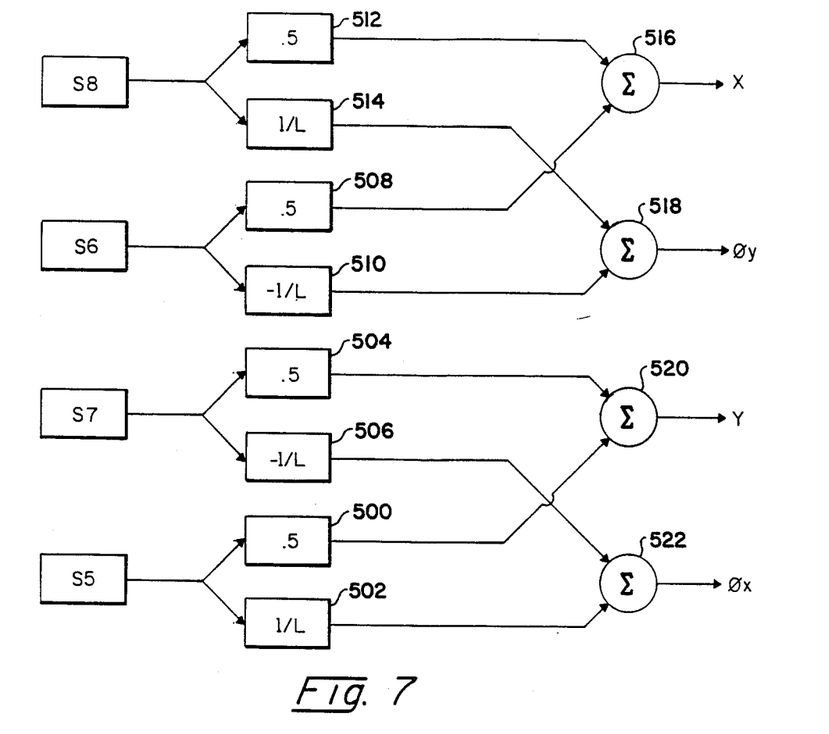
FIG. 7 is a block diagram of a resolver circuit for transforming the measured displacement signals of FIG. 6 into output signals representative of translational and rotational displacements.
Figure 8:
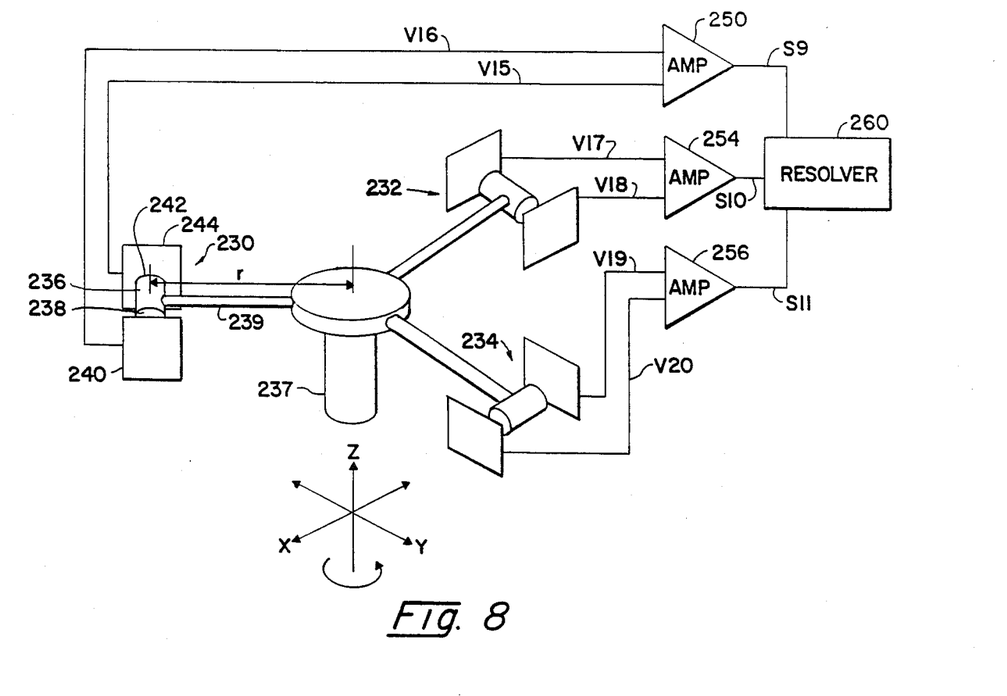
FIG. 8 is a schematic view of a displacement sensor which includes three displacement sensing units for measuring displacement in three degrees of freedom.

As shown in FIG. 7, signal S5 is multiplied by the factor 0.5 in multiplier circuit 500 and by the factor 1/L in multiplier circuit 502. Similarly, displacement signal S7 is multiplied by the factor 0.5 in multiplier circuit 504 and by the factor $-1/L$ in multiplier circuit 506; displacement signal S6 is multiplied by the factor 0.5 in circuit 508 and by the factor $-1/L$ in circuit 510; and signal S8 is multiplied by the factor 0.5 in circuit 512 and 1/L in circuit 514. The derived output from each of the multiplier circuits is then provided to one of four summer circuits 516, 518, 520 and 522. In particular the S6, S8 outputs derived from circuits 508 and 512 are combined in summer 516 to provide an output signal representative of actual translational displacement X. The S6 and S8 outputs derived from circuits 510 and 514 are combined in summer 518 to provide an output signal representative of actual rotational displacement $\theta_y$. The S5 and S7 outputs derived from circuits 500 and 504 are combined in summer 520 to provide an output signal representative of displacement Y. And the S5 and S7 outputs derived from circuits 502 and 506 are combined in summer 522 to provide an output signal representative of displacement $\theta_x$. Therefore, the relationship of actual displacements to measured signals is expressed algebraically as follows:

$X = (0.5)S8 + (0.5)S6$ $Y = (0.5)S7 + (0.5)S5$ $\theta_x = (-1/L)S7 + (1/L)S5$ $\theta_y = (1/L)S8 + (-1/L)S6$ In an alternative embodiment, FIG. 8, three sensing units 230, 232 and 234 are arranged generally in a plane which is perpendicular to the axis of symmetry of the compliance device. Sensing units 230, 232 and 234 are spaced equally about the axis of symmetry, with sensing unit 234 disposed along the X axis. Each sensing unit includes a permanent magnet 236 attached to a movable part 227 of the compliance device by an elongate arm 239. In particular, magnet 226 is disposed at a distance r from the axis of symmetry of the movable portion. Each magnet 226 includes a first pole 238, which faces a first Hall device 240, and a second pole 242 facing a second Hall Effect device 244. The Hall Effect devices are mounted upon the fixed portion, not shown, of the compliance device.

Again, in this embodiment, displacement in a particular degree of freedom yields a linear output signal. For example, the Hall Effect devices of sensing unit 230 provide signals V15 and V16 to an amplifier 250 which differentially combines the output signals to provide a signal S9 which is linearly representative of the movement of poles 238 and 242 between Hall Effect devices 240 and 244 of sensing unit 230. Similarly, the Hall Effect devices of unit 232 provide output signals V17 and V18 to amplifier 254, which differentially combines signals V17 and V18 to provide an output S10 which is linearly representative of the relative displacement between the poles and Hall Effect devices of unit 232. Output signals V19 and V20 from sensing unit 234 are differentially combined in amplifier 256 to provide a signal S11 which is linearly representative of relative displacement between the poles and Hall Effect devices of unit 234.

Signals S9, S10 and S11 are transformed to provide a direct measurement of X and Y translation and Z rotation according to the following matrix:

$$\begin{bmatrix} X \\ Y \\ \theta_z \end{bmatrix} = \begin{bmatrix} .33 & .33 & -.67 \\ .57 & -.57 & 0 \\ .33/r & .33/r & .33/r \end{bmatrix} \begin{bmatrix} S9 \\ S10 \\ S11 \end{bmatrix}$$

Figure 9:
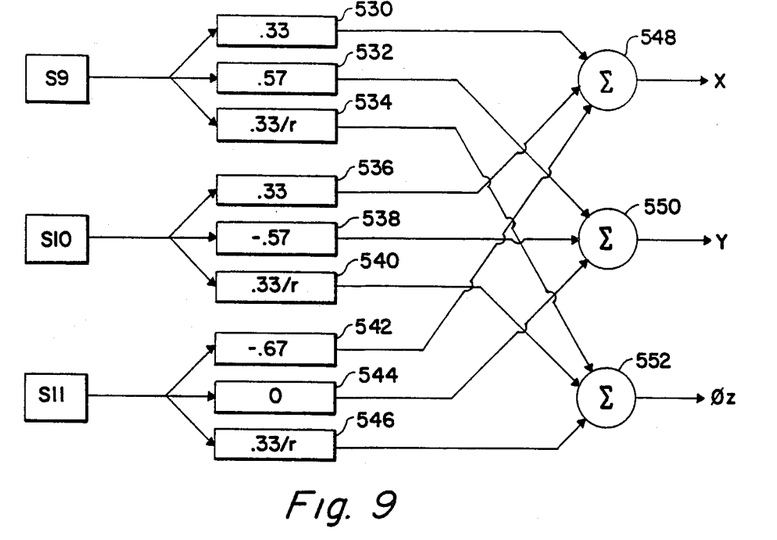
FIG. 9 is a block diagram of a resolver circuit for transforming the measured displacement signals of FIG. 8 into output signals representative of translational and rotational displacements.

This matrix is resolved in resolver circuit 260 as follows:

$X = (0.33)S9 + (0.33)S10 - (0.67)S11$ $Y = (0.57)S9 - (0.57)S10$ $\theta_z = (0.33/r)S9 + (0.33/r)S10 + (0.33/r)S11$ To implement these operations resolver circuit 260 includes a plurality of multiplier circuits 530–546, FIG. 9, which multiply the measured displacement signals by the various factors indicated therein. The outputs derived from these multiplier circuits are then combined as shown in groups of three in summer circuits 548, 550 and 552 to provide output signals representative of actual displacements X, Y and $\theta_z$.

Figure 10:
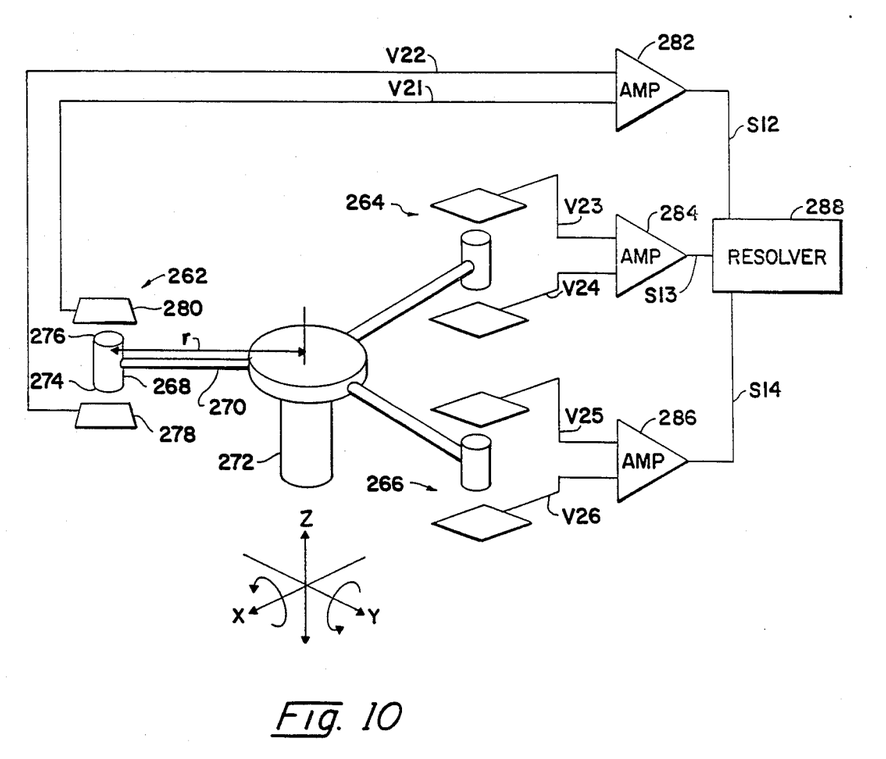
FIG. 10 is a schematic view of a displacement sensor which includes three alternatively arranged sensing units for measuring displacement in three different degrees of freedom.

Translational displacement along the Z axis, as well as X and Y rotational displacement, may be resolved as shown in FIG. 10. Therein three sensing units 262, 264 and 266 are disposed in a plane which is perpendicular to the axis of symmetry of the compliance device. The axis of each sensing unit is parallel to the axis of symmetry of the compliance device. Each sensing unit includes a magnet 268 which is mounted by an arm 270 to the movable part 272 of the compliance device. Each magnet 268 is located at a distance r from the axis of symmetry of movable part 272. The magnet includes opposite poles 274 and 276 which face Hall Effect devices 278 and 280, respectively. Sensing unit 262 provides output signals V21 and V22 to amplifier 282 which differentially combines the signals to provide an output S12 linearly representative of the displacement of magnet 268 between devices 278 and 280 of sensing unit 262. Sensing unit 264 provides output signals V23 and V24 to amplifier 284, where they are differentially combined to provide an output S13 linearly representative of the displacement of the magnet between the Hall Effect devices of unit 264. And sensing unit 266 provides signals V25 and V26 to amplifier 286, where they are differentially combined to provide a linear output signal S14.

Signals S12, S13 and S14 are provided to resolver 288 where they are transformed according to the matrix equation:

$$\begin{bmatrix} \theta_x \\ \theta_y \\ Z \end{bmatrix} = \begin{bmatrix} -.33/r & -.33/r & +.67/r \\ -.57/r & +.57/r & 0 \\ .33 & .33 & .33 \end{bmatrix} \begin{bmatrix} S12 \\ S13 \\ S14 \end{bmatrix}$$

This matrix is solved for $\theta_x$, $\theta_y$ and Z as follows to provide the measure of rotation about the X and Y axes and translation along the Z axis.

$$\theta_x = (-0.33/r)S12 + (0.33/r)S13 + (0.67/r)S14$$

$$\theta_y = (-0.57/r)S12 + (0.57/r)S13$$

$$Z = (0.33)S12 + (0.33)S13 + (0.33)S14$$

Figure 11:
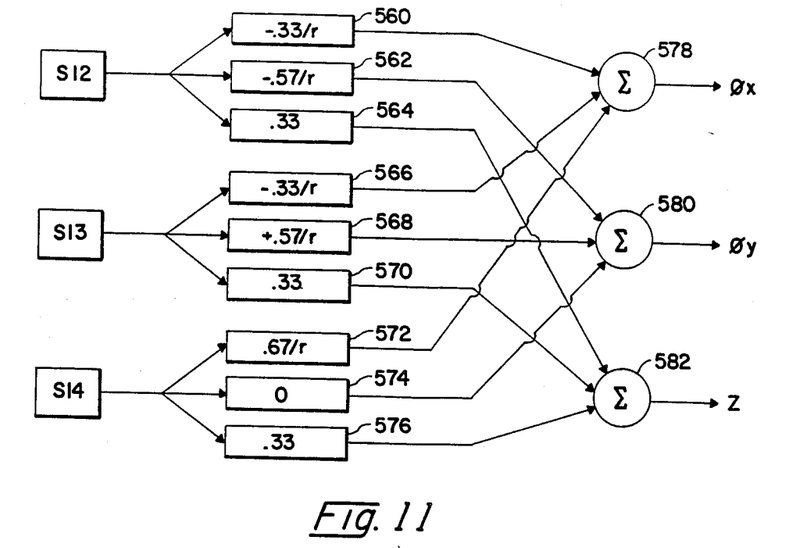
FIG. 11 is a block diagram of a resolver circuit for transforming the measured displacement signals of FIG. 10 into output signals representative of translational and rotational displacement.

Again circuit 288 includes a plurality of multiplier circuits 560-576, FIG. 11, which multiply the displacement signals by the various factors indicated both therein and in the equations above. The derived outputs are combined, as shown, in summer circuits 578, 580 and 582 to provide output signals representative of $\theta_x$, $\theta_y$ and Z displacements.

Figure 12:
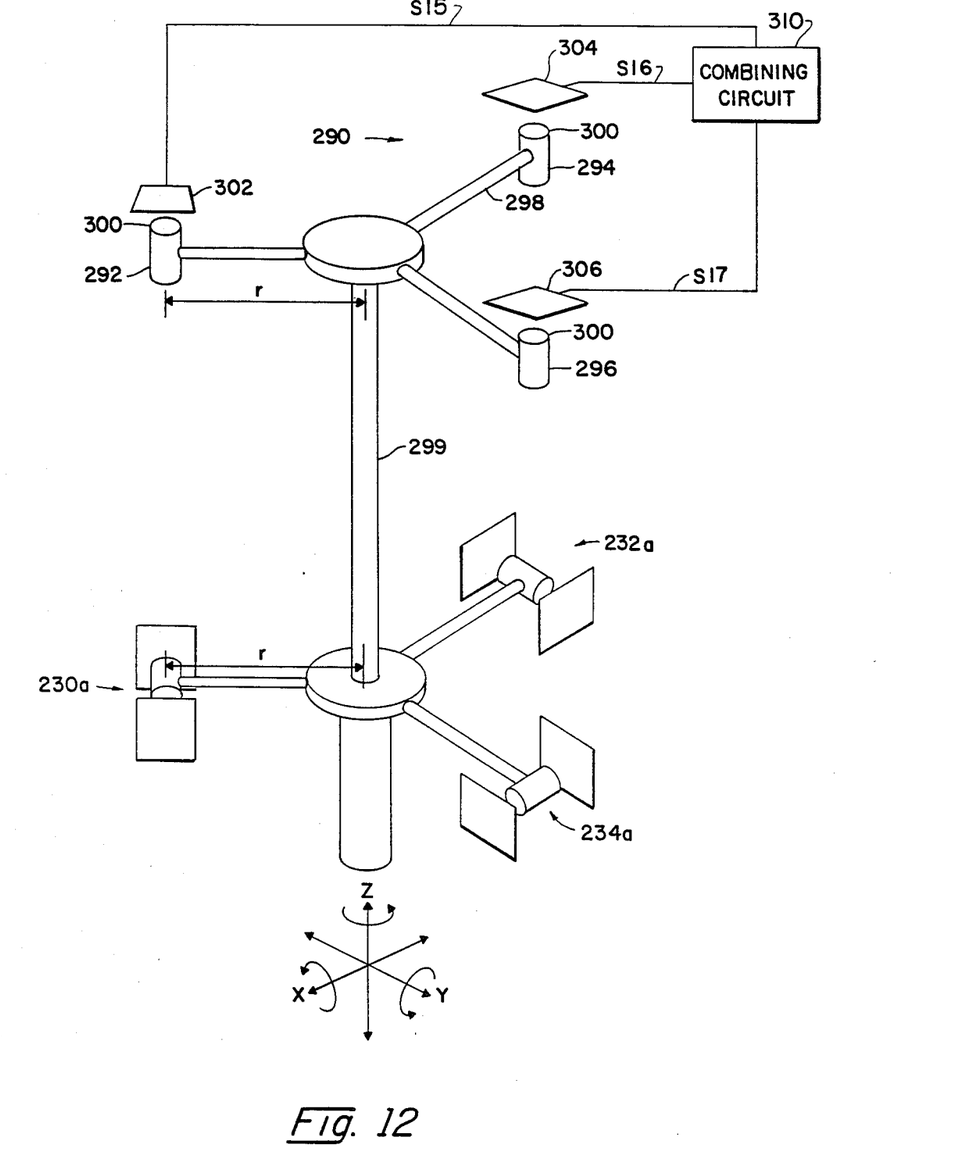
FIG. 12 is a schematic view of a displacement sensor which includes the sensing units shown in FIG. 8 as well as a sensing unit which includes three poles and three Hall Effect devices for measuring displacement in two additional degrees of freedom.

There are shown in FIG. 12 three sensing units 230a, 232a and 234a which are constructed and operate identically to the sensing units disclosed in FIG. 8, so that translational displacement is measured along the X and Y axes and rotational displacement is measured about the Z axis. Further included is a fourth sensing unit 290 which is arranged in a second plane perpendicular to the axis of symmetry of the compliance device.

In particular, sensing unit 290 includes three magnets 292, 294 and 296, each of which is attached by an arm 298 to movable part 299. The magnets are located at a distance r from the axis of symmetry of the movable part. Each magnet further includes a pole 300 which faces a respective Hall Effect device 302, 304 and 306. The Hall Effect devices are, again, mounted on the fixed portion, not shown, of the compliance device.

Sensing unit 290 is provided to detect rotation about the X and Y axes. In particular, for any given rotation of movable part 299 about the X and Y axes at least one of magnets 292, 294 and 296 moves toward a respective Hall Effect device and at least one of the other magnets moves away from its respective Hall Effect device. Hall Effect device 302 provides a signal S15; device 304 provides a signal S16; and device 306 provides a signal S17 to a combining circuit 310. Therein the signals are differentially combined and transformed according to the following matrix equations:

$$\begin{bmatrix} \theta_x \\ \theta_y \end{bmatrix} = \begin{bmatrix} -.33/r & -.33/r & +.67/r \\ -.57/r & -.57/r & 0 \end{bmatrix} \begin{bmatrix} S15 \\ S16 \\ S17 \end{bmatrix}$$

These equations are solved for X and Y rotational displacements as follows:

$$\theta_x = (-0.33/r)S15 + (-0.33/r)S16 + (0.67/r)S17$$

$$\theta_y = (-0.57/r)S15 + (0.57/r)S16$$

Figure 13:
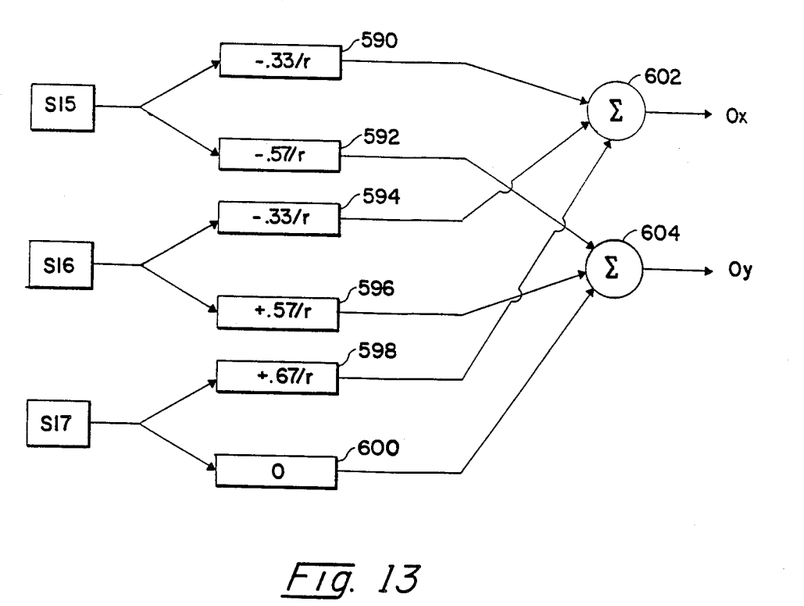
FIG. 13 is a block diagram of a combining circuit for transforming the measured displacement signals from the upper sensing unit of FIG. 12 into output signals representative of translational and rotational displacements.

As shown in FIG. 13, combining circuit 310 includes multiplier circuits 590-600 and summer circuits 602 and 604 which perform the above scaling factor multiplications and summations to yield output signals representative of the actual $\theta_x$ and $\theta_y$ displacements. As a result, sensor unit 290 is able to resolve displacements in two degrees of freedom. When it is combined with units 230a, 232a and 234a, the capability is provided for measurements in five degrees of freedom.

Figure 14:
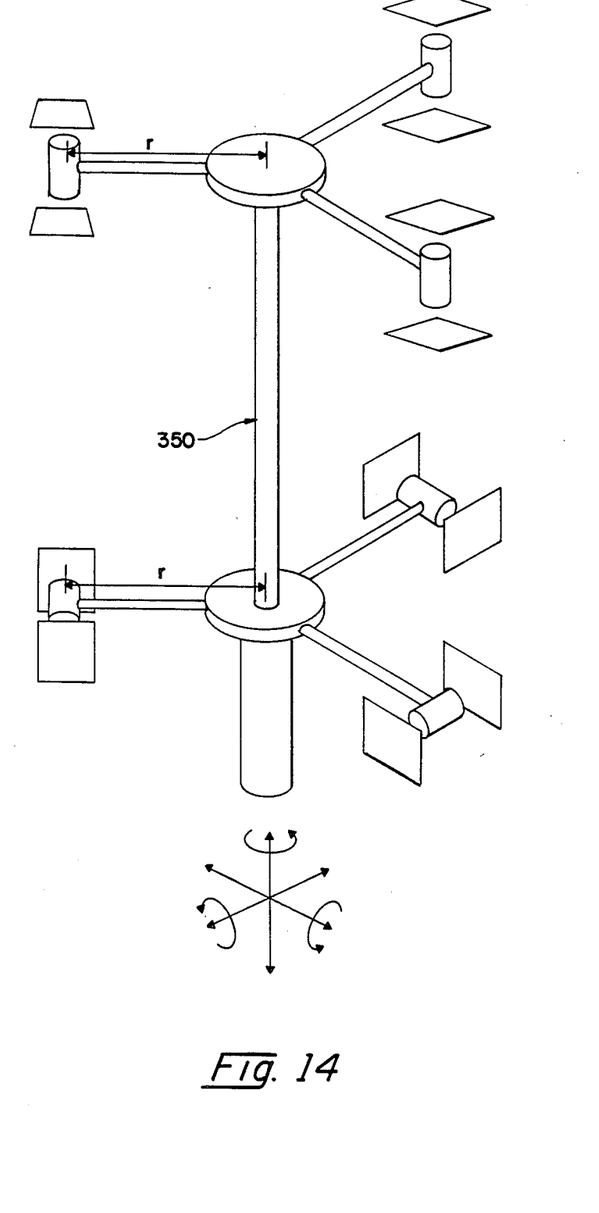
FIG. 14 is a schematic view of a displacement sensor which includes six displacement sensing units for measuring displacement in six degrees of freedom.

As shown in FIG. 14, the sensing units disclosed separately in FIGS. 8 and 10 may be combined in a single unit to measure the displacement of movable part 350 in all six degrees of freedom. Each of these sensing units operates as previously described.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A multiple axis displacement sensor for sensing displacement in a plurality of degrees of freedom of a compliance device having a movable part and a fixed part, comprising:

a plurality of displacement sensing units, each unit including at least two magnetic poles mounted on one of aid parts, and at least two Hall Effect devices mounted on the other of said parts and disposed relative to said poles so that displacement of the movable part relative to the fixed part in at least one degree of freedom causes at least one of said poles to move toward a respective Hall Effect device and at least one other of said poles to move away from another respective Hall Effect device, and means associated with each said sensing unit for differentially combining the outputs of each of said Hall Effect devices to produce a signal linearly representative of the displacement of said poles relative to said Hall Effect devices, and means for resolving said representative signal from at least two of said displacement sensing units into outputs signals representative of rotational and translational displacements of said movable parts to said fixed part.

2. The displacement device of claim 1 further including means for transforming said representative signal from at least two of said displacement sensing units into one or more output signals representative of rotational and translational displacements of said movable part relative to said fixed part.

The sensor of claim 1 in which said Hall Effect devices are mounted on said fixed part of said compliance device and said magnetic poles are mounted on said movable part.

3. The sensor of claim 1 in which a first pair of sensing units are disposed in a first plane which is perpendicular to the axis of symmetry of the compliance device.

4. The sensor of claim 3 further including a second pair of sensing units disposed in a second plane which is perpendicular to the axis of symmetry of the compliance device and spaced from said first plane.

5. The sensor of claim 3 in which said first pair of sensing units are arranged perpendicularly to each other about the axis of symmetry of the compliance device.

6. The sensor of claim 4 in which said second pair of sensing units are arranged perpendicularly to each other about the axis of symmetry of the compliance device.

7. The sensor of claim 1 in which at least one of said sensing units includes an axis which extends in a plane that is perpendicular to the axis of symmetry of the compliance device.

8. The sensor of claim 1 in which at least one of said sensing units includes an axis which is parallel to the axis of symmetry of the compliance device.

9. The sensor of claim 3 further including a third sensing unit disposed in said first plane at an angle from said first pair of units.

10. The sensor of claim 9 in which said sensing units in said first plane are equally spaced about the axis of symmetry of the compliance device.

11. The sensor of claim 4 further including a third sensing unit disposed in said second plane at an angle from said second pair of units.

12. The sensor of claim 11 in which said sensing units in said second plane are equally spaced about the axis of symmetry.

13. The sensor of claim 11 further including a third sensing unit disposed in said first plane at an angle from said first pair of sensing units.

14. The sensor of claim 3 further including means for transforming the representative signals from said first pair of sensing units directly into output signals representative of translational displacement of the movable part of the compliance device relative to the fixed part along two mutually perpendicular axes perpendicular to the axis of symmetry of the compliance device.

15. The sensor of claim 4 further including means for transforming the representative signals from said first and second pairs of sensing units directly into output signals representative of rotational displacement of the movable part of the compliance device relative to the fixed part about two mutually perpendicular axes perpendicular to the axis of symmetry of the compliance device and translational displacement of the movable member relative to the fixed part along the mutually perpendicular axes.

16. The sensor of claim 9 further including means for transforming the representative signals from said three sensing units directly into output signals representative of rotational displacement of the movable part of the compliance device relative to the fixed part about two mutually perpendicular axes perpendicular to the axis of symmetry of the compliance device and translational displacement of the movable part relative to the fixed part along the axis of symmetry.

17. The sensor of claim 9 further including means for transforming the representative signals from said three sensing units directly into output signals representative of translational displacement of the movable part of the compliance device relative to the fixed part along two mutually perpendicular axes perpendicular to the axis of symmetry of the compliance device and rotational displacement of the movable part relative to the fixed part about the axis of symmetry.

18. The sensor of claim 13 further including means for transforming the representative signals from said three sensing units in said first plane directly into output signals representative of translational displacement of the movable part of the compliance device relative to the fixed part along two mutually perpendicular axes perpendicular to the axis of symmetry of the compliance device and rotational displacement of the movable part relative to the fixed part about the axis of symmetry and means for transforming the representative signals from said three sensing units in said second plane directly into output signals representative of rotational displacement of the movable part relative to the fixed part about two mutually perpendicular axes perpendicular to the axis of symmetry and translational displacement of the movable part relative to the fixed part along the axis of symmetry.

19. The sensor of claim 1 in which one sensing unit includes three magnetic poles and three associated Hall Effect devices.

20. The sensor of claim 19 in which said means for combining includes means for transforming the output signals from said three Hall Effect devices directly into one or more output signals representative of rotational and translational displacements of the movable part relative to the fixed part.

21. The sensor of claim 1 in which said at least two poles are formed by permanent magnet means.

22. The sensor of claim 1 in which said at least two poles are formed by electromagnet means.

23. The sensor of claim 1 in which said at least two poles are formed by an annular magnet.

24. The sensor of claim 1 in which said means for differentially combining includes an amplifier circuit.

25. A multiple axis displacement sensor for sensing displacement of two relatively movable parts in a plurality of degrees of freedom comprising:
a plurality of displacement sensing units, each unit including at least two magnetic poles mounted on one of said parts, and at least two Hall effect devices mounted on the other of said parts and disposed relative to said poles so that relative displacement of the parts in at least one degree of freedom causes at least one of said poles to move toward a respective Hall Effect device and at least one other of said poles to move away from another respective Hall Effect device, and means associated with each said sensing unit for differentially combining the outputs of said hall Effect devices to produce a signal linearly representative of the relative displacement of said poles relative to said Hall Effect devices; and
means for resolving said representative signals from at least two of said displacement sensing units directly into one or more output signals representative of rotational and translational displacements of one of said parts relative to the other.

* * * * *